United States Patent
Polisetty et al.

(10) Patent No.: US 11,560,118 B2
(45) Date of Patent: Jan. 24, 2023

(54) DRIVE ASSEMBLY FOR DRIVING A VEHICLE FLAP

(71) Applicant: Edscha Enginerring GmbH, Remscheid (DE)

(72) Inventors: Srinath Polisetty, Auburn Hills, MI (US); Marc Milam, Rochester Hills, MI (US); Christoph Meese, Remscheid (DE); James Bong, South Lyon, MI (US); Katharina Freund, Lasalle (CA); Dan Tabacaru, Commerce Township, MI (US)

(73) Assignee: EDSCHA ENGINERRING GMBH, Remscheid (DE)

( * ) Notice: Subject to any disclaimer, the term of this patent is extended or adjusted under 35 U.S.C. 154(b) by 145 days.

(21) Appl. No.: 16/912,697

(22) Filed: Jun. 25, 2020

(65) Prior Publication Data

US 2021/0402953 A1     Dec. 30, 2021

(51) Int. Cl.
*B60R 21/38*     (2011.01)
*E05D 3/06*     (2006.01)
(Continued)

(52) U.S. Cl.
CPC ............... *B60R 21/38* (2013.01); *E05D 3/06* (2013.01); *E05F 1/00* (2013.01); *F16C 17/02* (2013.01); *E05Y 2900/536* (2013.01)

(58) Field of Classification Search
CPC ........... B60R 21/38; B60R 21/34; E05D 3/06; E05D 3/125; E05D 3/145; E05D 15/40;
(Continued)

(56) References Cited

U.S. PATENT DOCUMENTS 8,069,943 B2 * 12/2011 Takahashi ............... B60R 21/38
    180/274
8,662,236 B2     3/2014 Koestler et al.
(Continued)

FOREIGN PATENT DOCUMENTS

DE     10001054 A1     6/2001
DE     102010029410 A1     12/2011
(Continued)

*Primary Examiner* — Drew J Brown
(74) *Attorney, Agent, or Firm* — Davidson, Davidson & Kappel, LLC

(57) ABSTRACT

A drive assembly, in particular for driving a flap (5), includes a hinge assembly (2), comprising a first hinge part (3) connectable to a vehicle body and a second hinge part (4) connectable to a vehicle flap (5), a joint assembly (7) comprising at least a first joint part (8) hingedly connecting said first hinge part (3) with said second hinge part (4) and a first actuator (10) for driving the second hinge part (4) to move between an opened and a closed position during a normal operation. The first actuator (10) has a first end (10a) coupleable to a vehicle body pivotally about a first pivot axis (P1) and a second end (10b). The drive assembly also includes a bearing element connected (16) to the first actuator (10) and a coupling assembly (14) for coupling the first actuator (10) to the hinge assembly (2), comprising a first coupling part (15) having a first end (15a) and a second end (15b). The first end (15a) of the first coupling part (15) is coupled to one of the second hinge part (4) and first joint part (8) pivotally about a second pivot axis (P2). The bearing element (16) of the first actuator (10) is coupled to the second end (15b) of the first coupling part (15) pivotally about a third pivot axis (P3) spaced apart from the second pivot axis (P2). The drive assembly provides a possibility to move a vehicle flap drivingly between a closed and an opened position and further provides a reliable pedestrian protection function.

24 Claims, 8 Drawing Sheets

(51) Int. Cl.
*E05F 1/00* (2006.01)
*F16C 17/02* (2006.01)

(58) Field of Classification Search
CPC .......... E05D 15/46; E05F 1/00; E05F 1/1091;
E05F 15/622; E05F 15/60; F16C 17/02;
E05Y 2900/536; E05Y 2201/214; E05Y
2201/22; E05Y 2201/236; E05Y 2201/24;
E05Y 2201/608; E05Y 2201/624; E05Y
2201/626; E05Y 2800/40
See application file for complete search history.

(56) References Cited

U.S. PATENT DOCUMENTS

| | | | | |
|---|---|---|---|---|
| 8,768,574 | B1* | 7/2014 | Shaw | B60R 21/38 |
| | | | | 180/274 |
| 9,308,885 | B2* | 4/2016 | Schabenbergers | B60R 21/38 |
| 9,914,427 | B1* | 3/2018 | Kim | B60R 21/38 |
| 10,315,612 | B2* | 6/2019 | Yamada | B60R 21/38 |
| 2007/0074919 | A1* | 4/2007 | Hirata | B60R 21/34 |
| | | | | 180/69.2 |
| 2007/0187993 | A1* | 8/2007 | Kalargeros | E05D 11/00 |
| | | | | 296/193.11 |
| 2011/0290576 | A1 | 12/2011 | Koestler et al. | |
| 2020/0108793 | A1 | 4/2020 | Kim et al. | |

FOREIGN PATENT DOCUMENTS

| | | |
|---|---|---|
| DE | 102015109128 B3 | 7/2016 |
| DE | 10 2018 125 800 A1 | 10/2018 |
| DE | 102019131453 A1 * | 5/2021 |
| WO | WO 2006/086960 A1 | 8/2006 |

* cited by examiner

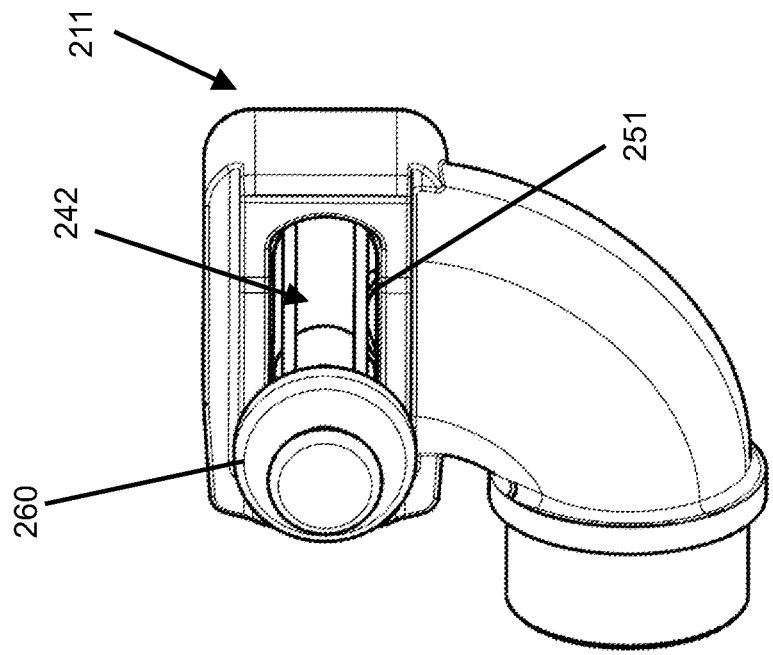
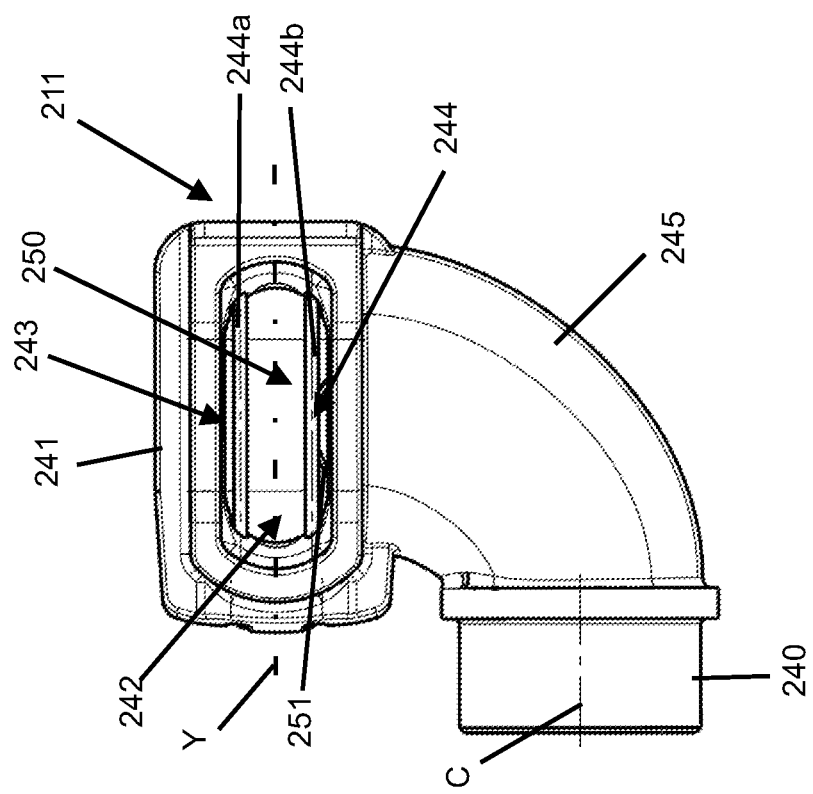

DRIVE ASSEMBLY FOR DRIVING A VEHICLE FLAP

The invention relates to a drive assembly, particularly for driving a flap. Further, the invention relates to a bearing element, in particular for use in a drive assembly.

BACKGROUND

From practice drive assemblies with a hinge assembly are known having a first hinge part which can be fixed to a vehicle body and a second hinge part fixed to the vehicle flap. For pivotally connecting the vehicle flap with the vehicle body the hinge assembly further comprises a joint assembly arranged between the first hinge part and the second hinge part. The joint assembly in some cases is configured to not only allow the pivoting movement of the vehicle flap between an opened and closed position for inspection purposes of the motor for example but is also configured to allow the elevation of the vehicle flap relative to the motor block or the vehicle body in general to provide a protection in particular for pedestrians in case of an accident in which the pedestrian may be injured heavily or even fatally by an impact on the hard motor block positioned closely below the vehicle flap. Such drive assemblies for that purpose comprise an actuator to drive the flap to move from the closed position to an elevated position such that the protection for pedestrians is provided in case of an accident. The actuator used is mostly configured as a pyrotechnical actuator that provides a very fast elevating movement of the flap to ensure that the protection of the pedestrians is provided safely and timely. Disadvantageously using an additional actuator for driving the movement of the vehicle flap between the opened and closed position is difficult as such an actuator in most cases is configured as a spindle drive which provides the needed force to move the flap from the fully closed to the fully opened position and vice versa but which is not fitted to move in such a fast way like it is provided by pyrotechnical actuators used in pedestrian protection systems as it may be damaged in case the pyrotechnical actuator is triggered during an accident.

WO 2006/086960 A1 shows a drive assembly for driving a flap of a vehicle comprising a hinge assembly with a first hinge part connectable to one of a vehicle body and a vehicle flap and a second hinge part connectable to the other of a vehicle body and a vehicle flap. The drive assembly further comprises a joint assembly configured as a four-bar linkage pivotally connecting the first hinge part with the second hinge part. The drive assembly further comprises a first actuator configured as a hydraulic drive coupled to the hinge assembly to drive the hinge assembly to move between an open and close position wherein the first actuator is connected between the vehicle body and the hinge assembly. The coupling assembly is arranged between the first actuator and the hinge assembly for coupling the first actuator to the hinge assembly. The coupling assembly comprises a first coupling part configured as a first lever connected to the first actuator at a first end. The first lever is pivotally connected to the first hinge part and is coupled with a second end facing away from the first actuator to a second coupling part pivotally connected to the second hinge part. The second coupling part is configured as a second lever wherein a first end of the second lever is pivotally connected to the second hinge part and a second end of the second lever is pivotally connected to the second end of the first coupling part. The shown drive assembly disadvantageously has two levers which are pivotally connected to each other to couple the first actuator to the hinge assembly. When the hinge assembly was elevated the first lever would also be rotated and thus a force would be acting on the first actuator which might lead to a damaging of parts of the first actuator or the elevating movement would be restrained and thus a sufficient pedestrian protection would not be provided.

DE 10 2018 125 800 A1 shows a drive assembly for driving a flap of a vehicle between an opened and closed position. The known drive assembly comprises a joint assembly pivotally connecting the flap of the vehicle with a body of the vehicle such that the flap is pivotable between the opened and closed position and further allows the flap to be displaced to an elevated position for providing pedestrian protection in which the flap is spaced apart from the motor block of the vehicle. The drive assembly further comprises a first actuator pivotally connected between the vehicle body and the vehicle flap for driving the movement of the flap between the opened and closed position. Further the drive assembly comprises a second actuator connected between the vehicle body and the vehicle flap for driving the movement of the flap to the elevated position for providing the pedestrian protection function. A first bearing element is fixedly connected to the flap of the vehicle wherein the first actuator is pivotally connected to the bearing element for coupling the first actuator to the flap of the vehicle. The first bearing element comprises a connecting region to connect the bearing element to the flap and a bearing region to which the first actuator is coupled pivotally. The bearing region comprises a rectangular shaped receptacle in which a coupling part is arranged to which the first actuator can be pivotally coupled. The coupling part is displaceable in the receptacle along an axial direction of the first bearing element such that the end of the first actuator to which the coupling part is coupled is also displaced along the axial direction of the first bearing element to ensure that in case the second actuator moves the flap to an elevated position very fast the length of the first actuator is nearly not effected as the first end of the actuator is displaced together with the coupling part of the first bearing element in case of activation of the pedestrian protection position of the flap. In the receptacle of the first bearing element a biasing arrangement is arranged to define a first position of the coupling part inside the receptacle corresponding the normal operation in which the flap is pivoted between the opened and closed position and a second position during an active mode in which the flap is moved to an elevated position fast. The biasing arrangement comprises a first biasing member and a second biasing members facing each other wherein the biasing members each preload a stopping member abutting against the coupling part and thus preventing the coupling part from being displaced axially in the rectangular shaped receptacle of the first bearing element.

SUMMARY

It is an object of the present disclosure to provide a drive assembly that provides the possibility to move a vehicle flap drivingly between a closed and an opened position and further provides a reliable pedestrian protection function.

The above object may be achieved by an improved drive assembly according to a first and a second aspect of the present disclosure and by an improved bearing element according to a third aspect of the present disclosure.

A drive assembly, in particular for driving a flap, is created wherein the drive assembly comprises a hinge assembly. The hinge assembly comprises a first hinge part connectable to a vehicle body and a second hinge part connectable to a vehicle flap and a joint assembly comprising at least a first joint part hingedly connecting said first hinge part with said second hinge part. The drive assembly further comprises a first actuator for driving the hinge assembly to move between an opened and closed position during a normal operation mode, wherein the first actuator has a first end coupleable to the vehicle body pivotally about a first pivot axis and a second end. Further the drive assembly comprises a first bearing element connected to the first actuator and a coupling assembly for coupling the first actuator to the hinge assembly. The coupling assembly comprises a first coupling part having a first end and a second end wherein the first end of the first coupling part is coupled to one of the second hinge part and the first joint part pivotally about a second pivot axis. The drive assembly is characterised in that the first bearing element of the first actuator is coupled to the second end of the first coupling part pivotally about a third pivot axis wherein the third pivot axis is spaced apart from the second pivot axis.

Advantageously the coupling assembly provides the possibility to displace the position of the first bearing element connected to the first actuator such that the length of the first actuator is not affected in case the hinge assembly is moving between the closed position and an elevated position driven by a second actuator as the difference of the length is compensated by the pivoting movement of the first coupling part about the second pivot axis. Advantageously the coupling assembly is adapted to reposition the third pivot axis such that in case that the hinge assembly is moved to the elevated position the first actuator is not forced to change its length. Thus, no forces act on the first actuator exceeding a certain threshold that might lead to a damaging of the first actuator or that may restrain the elevating movement of the hinge assembly.

Preferably the first actuator and the first coupling part during normal operation are arranged close to a dead-center position in which the first pivot axis, the second pivot axis and the third pivot axis are arranged in an essentially straight line. Advantageously this arrangement ensures that at least during normal operation in which the flap is moved by the first actuator between the closed and opened position the relative positions of the three pivot axes are fixed as the forces provided by the first actuator are directed along the straight line formed by the first, second and third pivot axis.

In a preferred embodiment the second pivot axis is axially arranged between the first pivot axis and the third pivot axis during normal operation. This further ensures that when the first actuator drives the flap towards the opened position or to the closed position the relative position of the first, second and third pivot axis remain fixed and the first coupling part in particular is not pivoted about the second pivot axis. In contrast during an active operation in which the flap is moved to the elevated position by a second actuator to provide pedestrian protection the first coupling part shall be driven to pivot about the second pivoting axis.

Expediently the second hinge part is displaceable to an elevated position relative to the first hinge part during an active operation to provide a pedestrian protection. Preferably during the active operation the first pivot axis, the second pivot axis and the third pivot axis are displaced beyond the dead centre position such that the first pivot axis, the second pivot axis and the third pivot axis define a triangle. Advantageously the displacement provides a compensation for the otherwise needed compression or extension of the first actuator to allow the elevating movement during the active operation. Preferably the first coupling part is rotated about the second pivot axis during the active operation.

Particularly preferably the coupling assembly comprises a stop arrangement. Expediently the stop arrangement comprises a first stopping element. Preferably the first stopping element abuts against the one of second hinge part and first joint part to which the first end of the first coupling part is coupled. The stopping arrangement advantageously ensures that the first coupling part is not pivotable about the second pivot axis further beyond the dead-centre position at least in one direction. The stopping arrangement thus advantageously limits the pivoting movement of the first coupling part. Advantageously the first axis, the second pivot axis and the third pivot axis can be arranged beyond a dead-centre position at least in one direction to ensure reliable movement of the second hinge part and the flap between the closed and open position driven by the first actuator.

A drive assembly, in particular for driving a flap, is created wherein the drive assembly comprises a hinge assembly. The hinge assembly comprises a first hinge part connectable to a vehicle body. The hinge assembly further comprises a second hinge part connectable to a vehicle flap. Further the hinge assembly comprises a joint assembly comprising at least a first joint part pivotally connecting said first hinge part with said second hinge part. The drive assembly further comprises a first actuator for driving the second hinge part between an opened and a closed position during a normal operation, wherein the first actuator has a first end coupled to a vehicle body pivotally about a first pivoting axis and a second end. Further the drive assembly comprises a coupling assembly for coupling the first actuator to the hinge assembly. The drive assembly is characterised in that the second end of the first actuator is releasably coupled to one of second hinge part and the first joint part via the coupling assembly. Advantageously the possibility to decouple the first actuator from the hinge assembly makes it possible to add a second actuator that moves the hinge assembly between the closed position and an elevated position during an active operation without interfering with the first actuator which may otherwise prevent or at least obstruct such a movement of the hinge assembly. Advantageously a pedestrian protection is provided and simultaneously the vehicle flap can be driven between the opened and closed position by the first actuator.

Preferably the first actuator is decoupled from the one of the second hinge part and the first joint part by actuating the first actuator to drive the second hinge part to move towards the closed position. Particularly preferably the first actuator is decoupled from the one of the second hinge part and the first joint part after the second hinge part has been moved to the fully closed position. Advantageously this ensures that the first actuator is decoupled from the second hinge part and the first joint part after the first actuator has moved the second hinge part and the flap to the fully closed position as the displacement of the second hinge part to an elevated position driven by a second actuator is generally to be expected when the flap is fully closed i.e. when driving of the vehicle normally and an accident involving a pedestrian is happening.

Expediently a first connecting part is arranged at a first coupling part of the coupling assembly. Advantageously the one of the second hinge part and the first joint part has a second connecting part releasably engageable with the first connecting part. Particularly preferably the first connecting part is configured as a tab. In a preferred embodiment the second connecting part is integral with the one of the second hinge part and the first joint part. Preferably the second connecting part configured as a recess. Advantageously the first connecting part configured as a tab may be inserted into the recess to establish the connection between the first actuator and the one of the second hinge part and the first joint part. By moving the first connecting part out of the recess the connection can be disconnected again.

Preferably the coupling assembly comprises a first coupling part having a first pivoting arm and a second pivoting arm wherein the first pivoting arm of the first coupling part is coupled to the second end of the first actuator. Expediently the second pivoting arm of the first coupling part is releasably coupled to the one of the second hinge part and the first joint part. Preferably the first coupling part is coupled to the first hinge part pivotally about a second pivoting axis.

Expediently, any of the above joint assemblies is configured as a four-bar linkage and comprises a second joint part, wherein the first joint part and the second joint part each are configured as linkage arms pivotally connected between the first hinge part and the second hinge part.

A bearing is created, in particular for use in a drive assembly as described above. The bearing element comprises a connecting section extending along a connecting axis to connect the bearing element to an actuator of the drive assembly. The bearing element further comprises a bearing section, wherein the bearing section comprises a receptacle having an elongated shape extending along a longitudinal axis. The bearing is characterized in that that the connecting axis and the longitudinal axis are radially spaced apart. Advantageously the bearing element provides the possibility to reposition the bearing element relative to the actuator for compensating forces acting on the actuator during a deployment or elevating movement of the vehicle flap and the actuator body is displaced radially relative to the bearing section to provide an optimal usage of installation space available. In particular the bearing element may also be installed in a middle section of the actuator for example.

Preferably the connecting section and the bearing section are connected by an angle piece. Expediently a biasing arrangement is arranged in the receptacle. The biasing arrangement advantageously comprises a first biasing member. The biasing member provides a barrier for a second bearing element to be connected to the bearing element that defines two positions or configurations of the bearing element. A first position corresponds to a normal operation in which a vehicle flap is moved between an opened and closed position. The second position corresponds to an position after the flap has been moved to an elevated position to provide pedestrian protection.

BRIEF DESCRIPTION OF THE DRAWINGS

Further advantages, embodiments and features of the invention follow from the description below of preferred embodiments. The invention is explained in more detail with reference to the attached figures of preferred embodiments of the invention.

FIG. 7 shows a preferred embodiment of a bearing element according to the invention.

FIG. 8 shows the bearing element from FIG. 7 with a ball stud connected to it in a first position.

DETAILED DESCRIPTION

Figure 1:
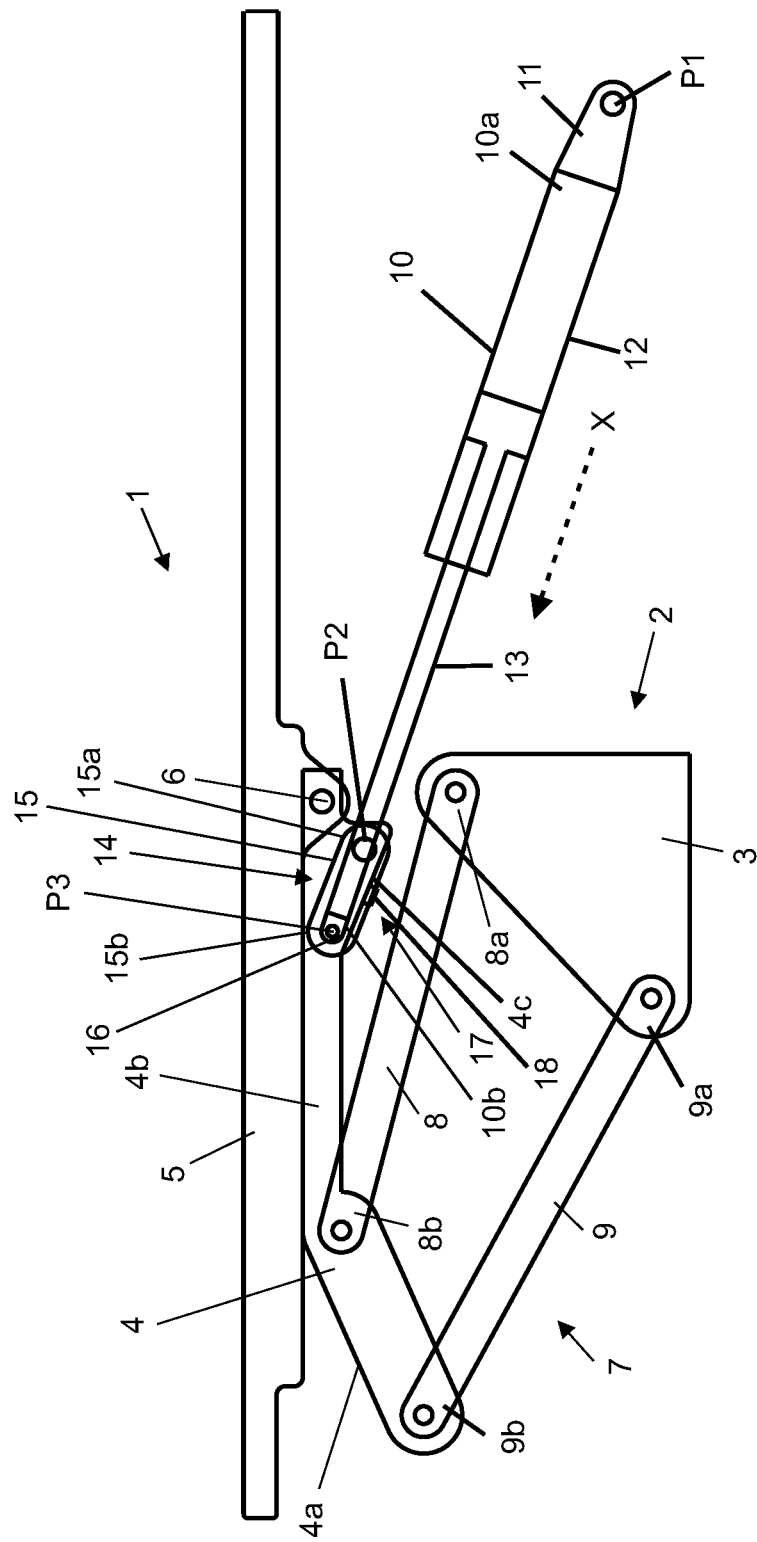
FIG. 1 shows a first preferred embodiment of a drive assembly according to the invention in a sideview with the hinge assembly in a closed position.

FIG. 1 shows a first preferred embodiment of a drive assembly 1 according to the invention in a sideview. The drive assembly 1 comprises a hinge assembly 2 having a first hinge part 3 fixedly connectable to a vehicle body and a second hinge part 4. The second hinge part 4 is configured as a sheet metal part having a hinge section 4a and a fastening section 4b, wherein a vehicle flap 5 is pivotally connected to the fastening section 4b by means of a swivel joint 6. The swivel joint 6 is arranged at a side of the fastening section 4b remote of the hinge section 4a. The hinge assembly 2 in FIG. 1 is in a closed position in which the flap 5 fully covers the motor block of a vehicle for example. The fastening section 4b and the flap 5 in this closed position are horizontally aligned.

The hinge section 4a of the second hinge part 4 is connected to a joint assembly 7 which pivotally connects the first hinge part 3 and the second hinge part 4. The joint assembly 7 allows the second hinge part 4 and thus the flap 5 to be moved between the closed position shown in FIG. 1 and an opened position shown in FIG. 2 in which the vehicle flap is swivelled about a predetermined angle.

Figure 3:
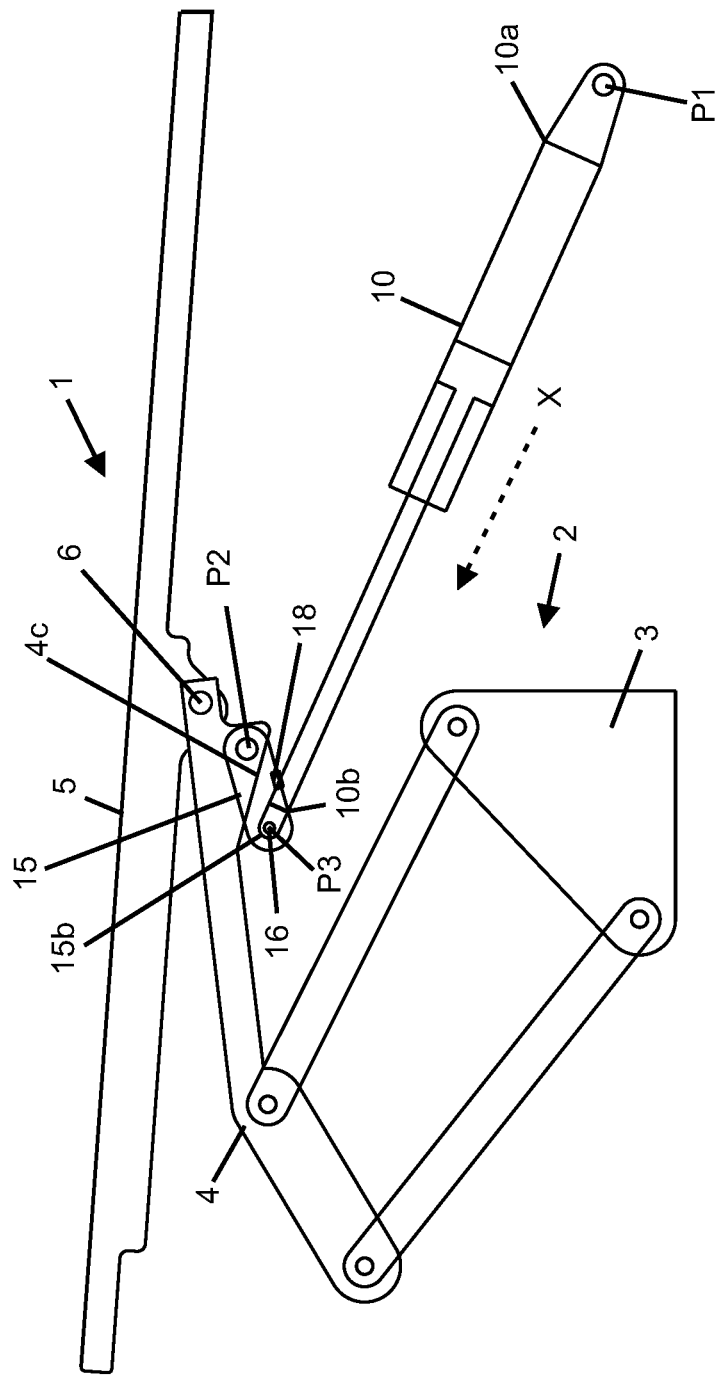
FIG. 3 shows the drive assembly from FIG. 1 with the hinge assembly in a deployed position.

Further the joint assembly 7 allows the second hinge part 4 and the vehicle flap 5 to move to an elevated position shown in FIG. 3 to provide a pedestrian protection. The joint assembly 7 comprises a first joint part 8 configured as a linkage arm wherein the first joint part 8 is pivotally connected with a first end 8a to the first hinge part 3 and with a second end 8b to the second hinge part 4.

The joint assembly 7 further comprises a second joint part 9 configured as a linkage arm as well wherein the second joint part 9 is pivotally connected with a first end 9a to the first hinge part 3 and with a second end 9b to the second hinge part 4. The joint assembly 7 hence is configured as a four-bar linkage being able to provide the possibility to elevate the second hinge part 4 and the vehicle flap 5 upwards to an elevated position shown in FIG. 3 in addition to be able to move the second hinge part 4 and thus the flap 5 normally between an closed and opened position.

The drive assembly 1 further comprises a first actuator 10 configured as a spindle drive for drivingly move the second hinge part 4 and the connected vehicle flap 5 between the opened and closed position. The first actuator 10 is extendable and retractable along its longitudinal axis X for actuating the hinge assembly 2 to move between a closed and opened position. A first bearing element 11 is connected to a first end 10a of the first actuator 10 for pivotally connecting the first actuator 10 to the vehicle body about a first pivot axis P1. The first bearing element 11 is configured as a ball bearing connectable to a corresponding ball stud arranged at the vehicle body.

The first actuator 10 comprises a housing 12 and a rod 13 axially extendable relative to the housing 12 such that the first actuator 10 is extendable and retractable along its longitudinal axis X. A second end 10b of the first actuator 10 is coupled to the second hinge part 4 via a coupling assembly 14 arranged between the second end 10b of the first actuator 10 and the second hinge part 4. The coupling assembly 14 is configured to advantageously ensure that the first actuator 10 is not damaged in case the second hinge part 4 and the vehicle flap 5 are quickly moved into an elevated position shown in FIG. 3 by a second actuator. As the first actuator 10 is configured as a spindle drive it cannot follow such fast movements without being damaged due to the high forces produced by the second actuator or without obstructing significantly the elevating movement driven by the second actuator.

The coupling assembly 14 comprises a first coupling part 15 configured as an elongated pivoting bracket having a first end 15a coupled to the second hinge part 4 pivotally about a second pivot axis P2. The first coupling part 15 further has a second end 15b opposite the first end 15a wherein the second end 15b of the first coupling part 15 is coupled to the second end 10b of the first actuator 10. A second bearing element 16 is arranged at the second end 10b of the first actuator 10 such that the second end 15b of the first coupling part 15 is coupled to the first actuator 10 pivotally about a third pivot axis P3. The second bearing element 16 is configured as a ball bearing coupled to a corresponding ball stud arranged at the second end 15b of the first coupling part 15.

The coupling assembly 14 further comprises a stop arrangement 17. The stop arrangement 17 comprises a stop element 18 arranged at a lower edge of the first coupling part 15. The stop element 18 is configured as a stop pin which is protruding from the first coupling part 15, wherein the stop element 18 abuts against a lower edge 4c of the second hinge part 4. The stop element 18 thus ensures that the first coupling part 15 does not rotate about the second pivoting axis P2 during normal operation of the drive assembly 1 in which only a driven movement of the vehicle flap between an open and close position shall be performed. In particular the stop element 18 limits the pivoting movement of the first coupling part 15 at least in a direction towards the lower edge 4c of the second hinge part 4.

Figure 2:
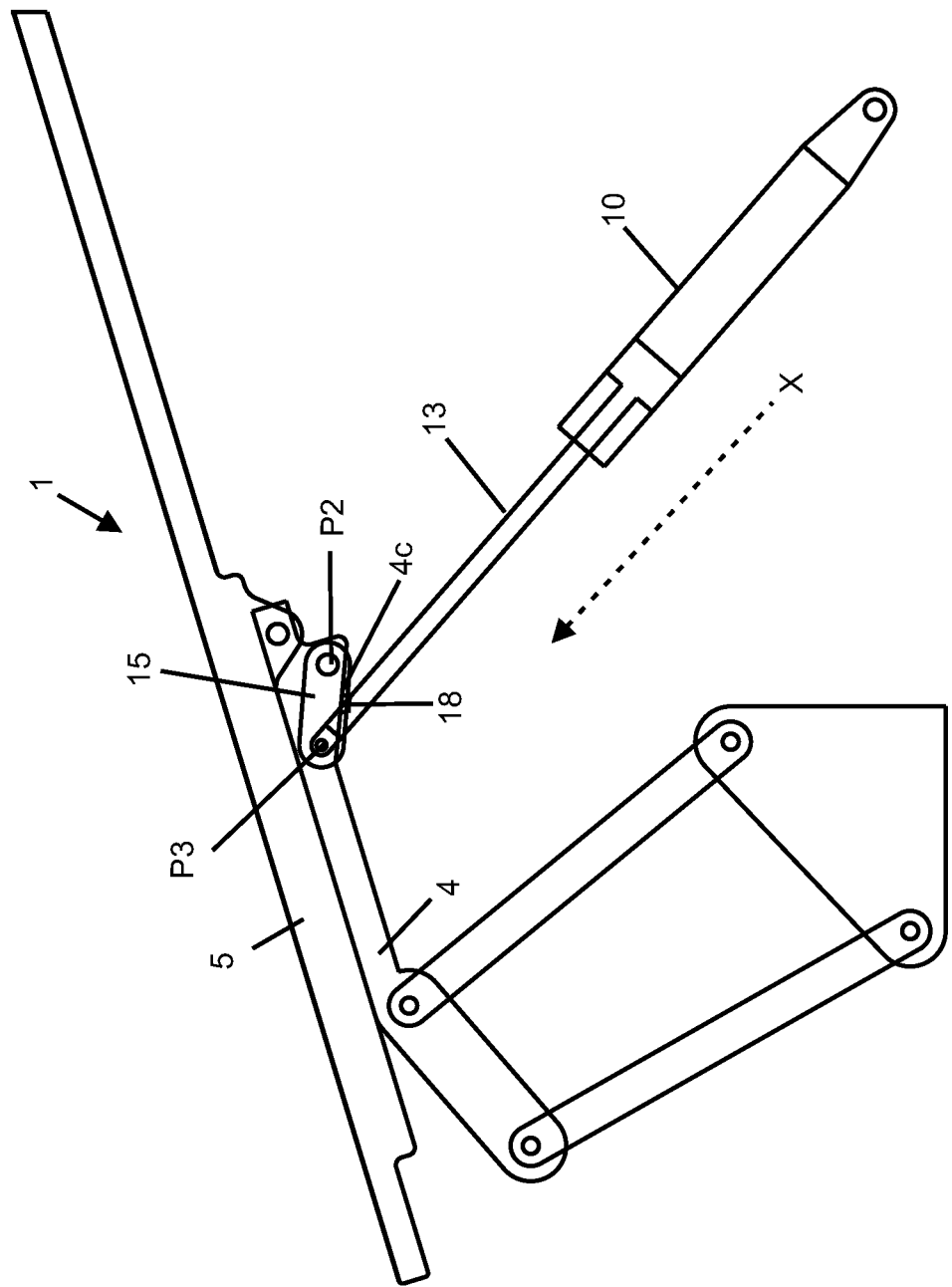
FIG. 2 shows the drive assembly from FIG. 1 with the hinge assembly in an opened position.

FIG. 2 shows the drive assembly 1 from FIG. 1 with the hinge assembly 2 in an opened position. As can be seen in FIG. 2 the first actuator 10 and in particular the rod 13 is extended in comparison to the closed position of the hinge assembly 2 shown in FIG. 1. The first coupling part 15 is not rotated about the second pivot axis P2 during the movement towards the open position as the rotation is locked by the stop element 18 abutting against the lower edge 4c of the second hinge part 4. Thus the linear force produced by the extension of the first actuator 10 is fully utilized for moving the second hinge part 4 and the flap 5 into the shown opened position. The first coupling part 15 is rotated about the third pivot axis P3 such that the second hinge part 4 and the flap 5 are swivelled about a predetermined angle.

When the rod 13 of the first actuator 10 is retracted along its longitudinal axis X the second hinge part 4 and the flap 5 will move to the closed position shown in FIG. 1 due to their weight. During the closing movement the first coupling part 15 will also not rotate about the second pivot axis P2 as the stop element 18 abuts against the lower edge 4c of the second hinge part. When the rod 13 is nearly retracted fully the first pivot axis P1, the second pivot axis P2 and the third pivot axis P3 will be aligned nearly along a straight line. This means the first coupling part 15 together with the first actuator 10 are in a dead centre position such that the closing force to fully close the flap can be applied without the first coupling part 15 being pivoted about the second pivot axis P2.

FIG. 3 shows the drive assembly 1 from FIG. 1 with the hinge assembly 2 in an elevated or deployed position. In this situation the second hinge part 4 and the flap 5 are in an elevated position relative to the first hinge part 3 to provide a pedestrian protection. In the elevated position the flap 5 is swivelled about the swivel joint 6 such that the flap 5 is inclined relative to the second hinge part 4. As can be seen the first coupling part 15 of the coupling assembly 14 is pivoted about the second pivot axis P2 in comparison to the closed and opened position such that the stop element 18 fixed to the first coupling part 15 is now spaced apart from the lower edge 4c of the second hinge part 4. The first pivot axis P1, the second pivot axis P2 and the third pivot axis P3 in this position form a triangle. Advantageously the distance between the first end 10a and the second end 10b of the first actuator 10 or the length of the first actuator 10 is the same as in the closed position shown in FIG. 1 due to the pivoting of the first coupling part 15 as the second bearing element 16 coupled to the second end 15b of the first coupling part 15 is pivoted away from the second hinge part 4.

Figure 4:
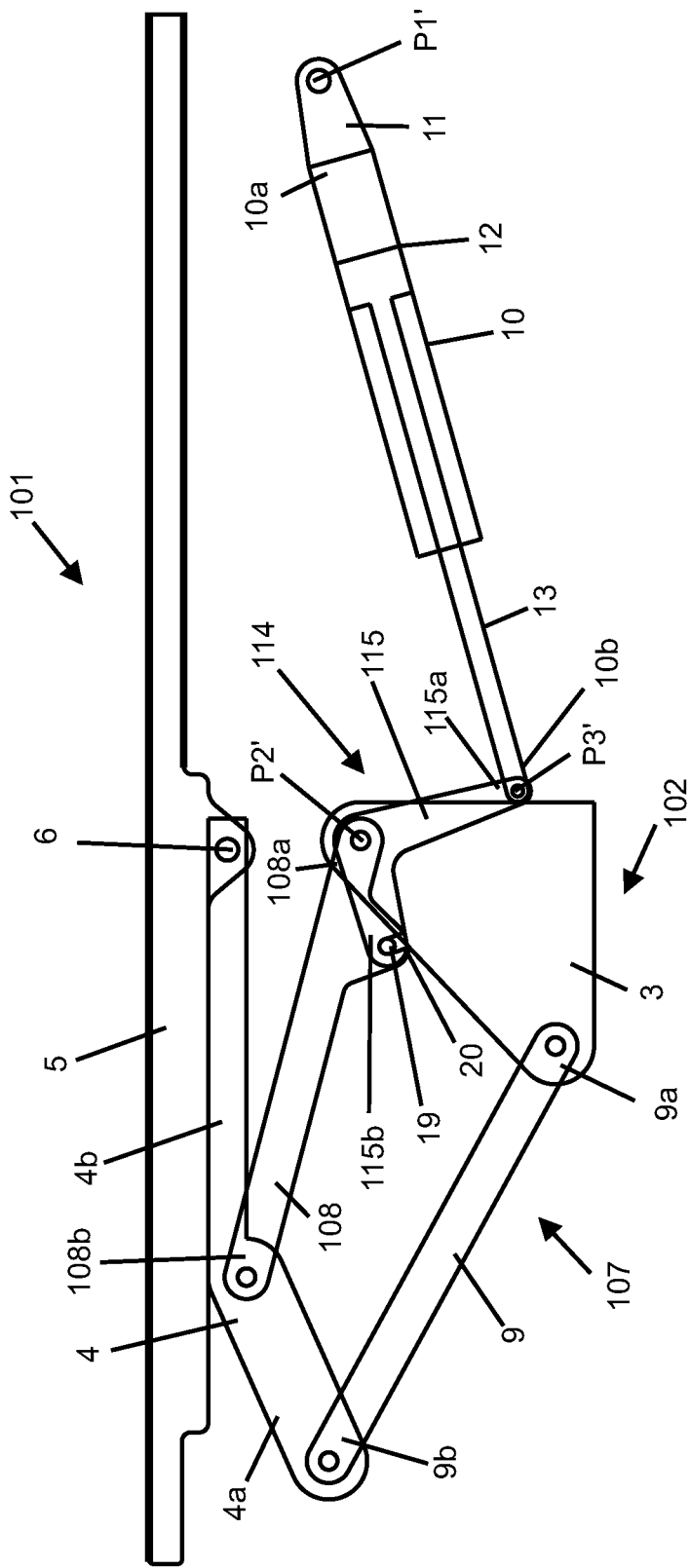
FIG. 4 shows a second preferred embodiment of a drive assembly according to the invention in a sideview with the hinge assembly in a closed position.

FIG. 4 shows a second preferred embodiment of a drive assembly 101 according to the invention in a sideview with the hinge assembly 102 in a closed position. The same or structurally comparable parts are designated by the same reference symbols, and parts that have been changed substantially are designated by reference symbols that have been incremented by 100 in comparison to the first embodiment of the drive assembly from FIG. 1.

The drive assembly 101 comprises a hinge assembly 102 having a first hinge part 3 fixedly connectable to a vehicle body and a second hinge part 4. The second hinge part 4 is configured as a sheet metal part having a hinge section 4a and a fastening section 4b, wherein a vehicle flap 5 is pivotally connected to the fastening section 4b by means of a swivel joint 6. The drive assembly 101 further comprises a joint assembly 107. The joint assembly 107 comprises a first joint part 108 configured as a linkage arm wherein the first joint part 108 is pivotally connected with a first end 108a to the first hinge part 3 and with a second end 108b to the second hinge part 4.

The joint assembly 107 further comprises a second joint part 9 configured as a linkage arm wherein the second joint part 9 is pivotally connected with a first end 9a to the first hinge part 3 and with a second end 9b to the second hinge part 4. The joint assembly 107 hence is configured as a four-bar linkage being able to provide the possibility to elevate the second hinge part 4 and the vehicle flap 5 upwards to an elevated position shown in FIG. 6 in addition to be able to move the second hinge part 4 and thus the flap 5 normally between an closed and opened position.

The drive assembly 101 further comprises a first actuator 10 configured as a spindle drive for driving a movement of the second hinge part 4 and the connected vehicle flap 5 between the open and closed position. A first bearing element 11 is connected to a first end 10a of the first actuator 10 for pivotally connecting the first actuator 10 to the vehicle body about a first pivot axis P1'. The first bearing element 11 is configured as a ball bearing.

The first actuator 10 further comprises a housing 12 and a rod 13 axially extendable relative to the housing 12 such that the first actuator 10 is extendable and compressible. A second end 10b of the first actuator 10 is coupled to the second hinge part 4 via a coupling assembly 114 arranged between the second end 10b of the first actuator 10 and the joint assembly 107.

The coupling assembly 114 comprises a first coupling part 115 configured as a pivoting bracket having a L-shape. The first coupling part 115 has a first pivoting arm 115a and a second pivoting arm 115b, wherein the first pivoting arm 115a and the second pivoting arm 115b mutually enclose an angle. The first coupling part 115 is coupled to the first hinge part 3 pivotally about a second pivot axis P2' arranged between the first pivoting arm 115a and the second pivoting arm 115b. Thus the first pivoting arm 115a and the second pivoting arm 115b are pivotable about the second pivot axis P2'. The second end 10b of the first actuator 10 is coupled to the first pivoting arm 115a pivotally about a third pivot axis P3'.

The coupling assembly 114 further comprises a first connecting part 19 fixed to the first coupling part 115. The first connecting part 19 is arranged at an end of the second pivoting arm 115b distant from the second pivot axis P2'. The coupling assembly 114 further comprises a second connecting part 20 arranged at the joint assembly 107. In the preferred embodiment shown in FIG. 4 the second connecting part 20 is configured as a recess formed at the first joint part 108 configured as a linkage arm. Thus the second connecting part 20 is integral with the first joint part 108. In the closed position the first connecting part 19 is configured as a pin. The first connecting part 19 or pin is inserted in the second connecting part 20 configured as a recess. Advantageously when the first actuator 10 is extended the first coupling part 115 is rotated clockwise about the second pivot axis P2' and as the first connecting part 19 is inserted into the second connecting part 20 the first coupling part 115 transfers a force to the joint assembly 107 to move the hinge assembly 102 to an opened position shown in FIG. 5.

Figure 5:
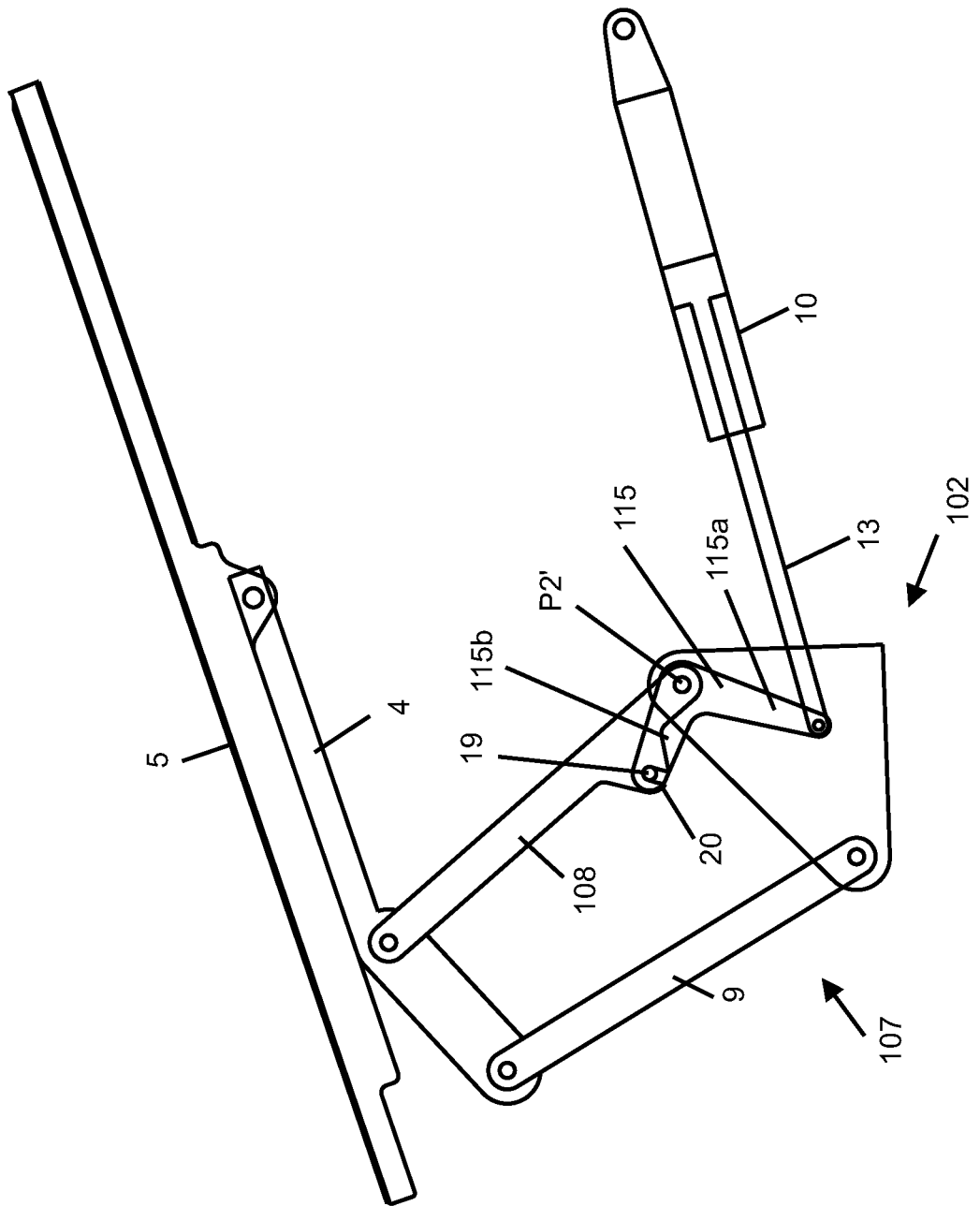
FIG. 5 shows the drive assembly from FIG. 4 with the hinge assembly in an opened position.

FIG. 5 shows the drive assembly from FIG. 4 with the hinge assembly 102 in an opened position. The first coupling part 115 is rotated about the second pivot axis P2' due to the extension of the rod 13 of the first actuator 10 coupled to the first pivoting arm 115a and the second pivoting arm 115b of the first coupling part 115. Due to the connection between the first coupling part 115 and the joint assembly 107 in particular the first joint part 108 through the first connecting part 19 and the second connecting part 20 the first joint part 108 and the second joint part 9 together with the second hinge part 4 and the flap 5 are moved to the opened position.

Figure 6:
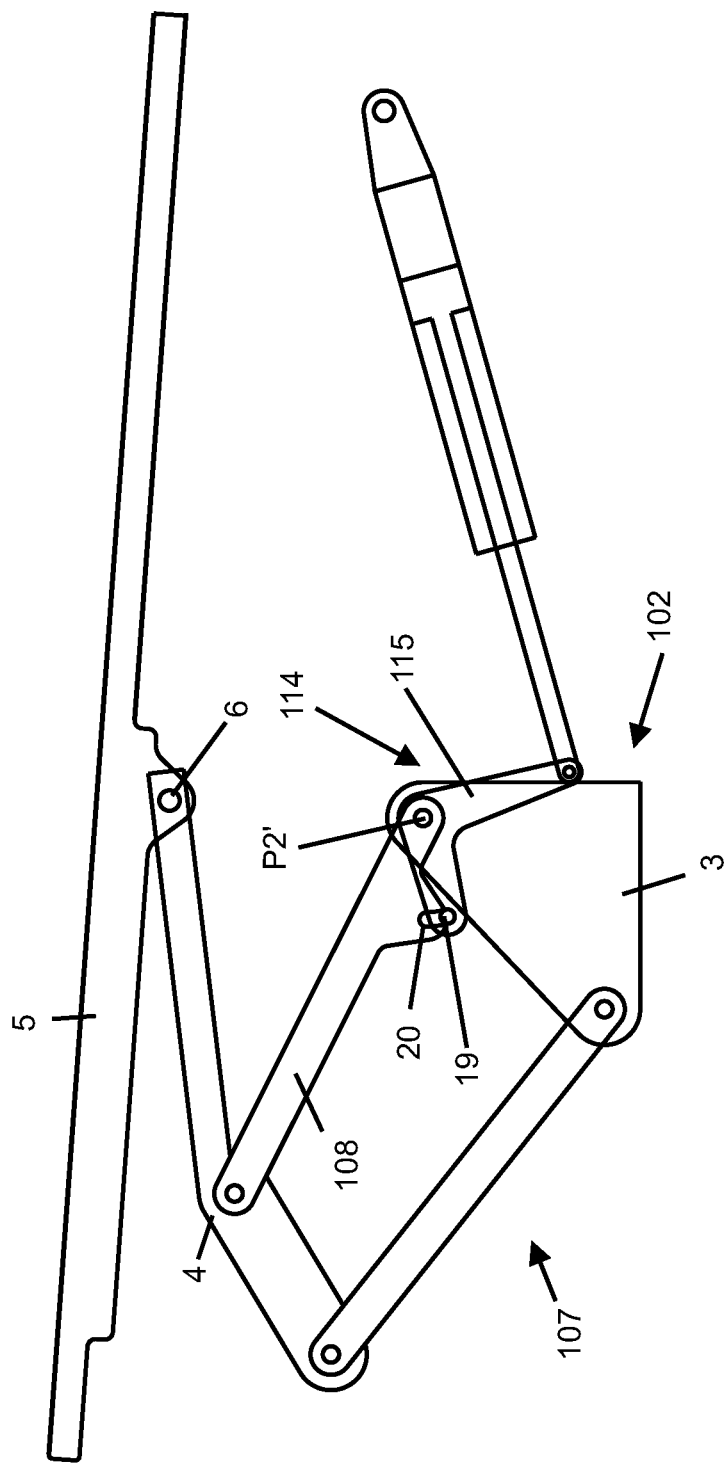
FIG. 6 shows the drive assembly from FIG. 4 with the hinge assembly in a deployed position.

FIG. 6 shows the drive assembly from FIG. 4 with the hinge assembly 102 and the joint assembly 107 in an elevated position. In this situation the second hinge part 4 and the flap 5 is in an elevated position relative to the first hinge part 3 to provide a pedestrian protection. In the elevated position the flap 5 is swivelled about the swivel joint 6 such that the flap 5 is inclined relative to the second hinge part 4. As can be seen the first coupling part 115 of the coupling assembly 114 was not pivoted about the second pivot axis P2' in comparison to the closed position shown in FIG. 4. This is due to the fact that in the closed position the first connecting part 19 is allowed to travel towards the open end of the second connecting part 20 configured as a recess and the second connecting part 20 and the first joint part 108 may rotate about the second pivot axis P2' away from the first connecting part 19.

Thus when the joint assembly 107 and the hinge assembly 102 are driven by a second actuator towards the shown elevated position the first joint part 108 can rotate about the second pivot axis P2' without being obstructed by the first coupling part 115 as the first coupling part 115 is decoupled at least in one direction from the joint assembly 107 and in particular from the first joint part 108. Advantageously the coupling assembly 114 allows the movement of the assembly 102 and a joint assembly 107 towards an elevated position as the first coupling part 115 is decoupled during the elevating movement.

FIG. 7 shows a preferred embodiment of a bearing element 211 according to the invention. The bearing element 211 is configured as a ball bearing comprising a connecting section 240 extending along a connecting axis C. The bearing element 211 is thus connectable to any end 10a, 10b of a first actuator 10 of a drive assembly 1, 101 as shown in FIGS. 1 to 6 by a connecting method like press-fitting for example. Further the bearing element 211 comprises a bearing section 241 having a receptacle 242 with an elongated shape.

The receptacle 242 extends along a longitudinal axis Y parallel to the connecting axis C of the connecting section 240. The receptacle 242 is configured to receive a corresponding ball stud shown in FIG. 8. In the receptacle 242 a locking arrangement 243 is arranged for locking a ball stud in place in a direction perpendicular to the longitudinal axis Y of the receptacle 242. The locking arrangement 243 comprises a clip element 244 having two clip legs 244a, 244b.

The connecting section 240 and the bearing section 241 are connected by an angle piece 245 arranged between the connecting section 240 and the bearing section 241. The angle piece 245 is integral with the connecting section 240 and the bearing section 241 of the bearing element 211. The longitudinal axis Y of the receptacle 242 is thus radially spaced apart from the connecting axis C.

The bearing element 211 further comprises a biasing arrangement 250 arranged in the receptacle 242 of the bearing section 241. The biasing arrangement 250 comprises a preload element 251 configured as a spring. The preload element 251 is arranged in the middle of the receptacle 242. Advantageously the preload element 251 provides a barrier for the ball stud shown in FIGS. 8 and 9 to overcome for it to change its position between a first position shown in FIG. 8 and a second position shown in FIG. 9.

FIG. 8 shows the bearing element 211 with a ball stud 260 connected to it in a first position. The ball stud 260 is held in the shown first position by the preload element 251. In case a threshold force is acting on the bearing element 211 or the ball stud 260 in particular in case a hinge assembly connected to the bearing element 211 is moved to an elevated position for providing a pedestrian protection the ball stud 260 can move along the longitudinal axis of the receptacle 242 beyond the preload element in the receptacle 242 to a second position shown in FIG. 9

Figure 9:
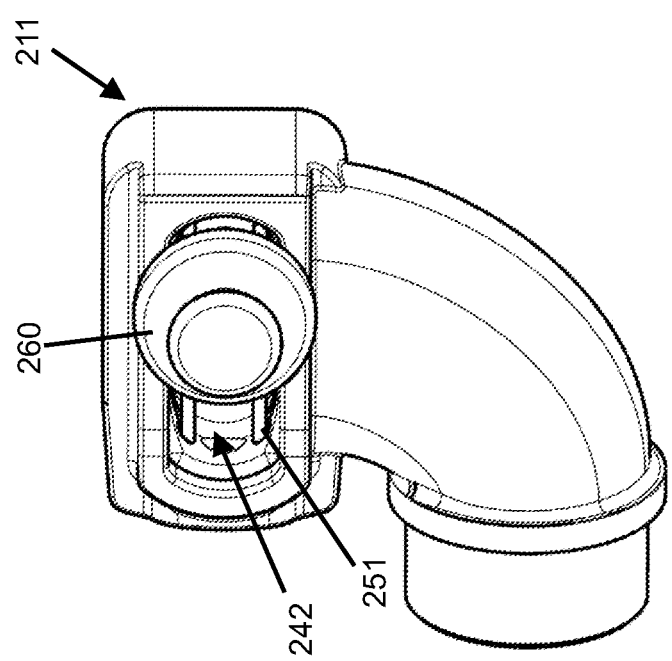
FIG. 9 shows the bearing element with a ball stud in a second position.

FIG. 9 shows the bearing element 211 with a ball stud 260 in a second position. The ball stud 260 moved along the longitudinal axis Y of the receptacle 242 to the second position after moving over the preloading element 251.

Above the embodiment of a drive assembly is described in which the actuator element was configured as a spindle. It has to be understood that the actuator may also be any kind of linear actuator which is extendable and compressible.

The invention has been described hereinbefore with reference to different preferred embodiments having the features, advantages, and particulars as stated in detail with regard to the drawings. It has to be understood that any feature disclosed in any described embodiment should be considered to be also disclosed in combination with another of the above embodiments, if technically senseful. In particular, the above described alternatives for a coupling assembly of said first actuator and said hinge assembly can also be provided in the drive assembly according to the invention in combination or in partial combination to achieve the desired technical effect.

It has to be noted that the normal operation of the hinge part is intended to designate the conventional opening and the conventional closing operation without any raising or partial raising of the flap responsive to a detection of a pedestrian impact.

The invention claimed is:

1. A drive assembly for driving a flap, the drive assembly comprising:
   a hinge assembly comprising a first hinge part connectable to a vehicle body and a second hinge part connectable to a vehicle flap;
   a joint assembly comprising at least a first joint part hingedly connecting said first hinge part with said second hinge part;
   a first actuator for driving the second hinge part to move between an opened and a closed position during a normal operation, wherein the first actuator has a first end coupleable to the vehicle body pivotally about a first pivot axis and a second end;
   a bearing element connected to the first actuator; and
   a coupling assembly for coupling the first actuator to the hinge assembly, the coupling assembly comprising a single-piece first coupling part configured as a pivoting bracket having a first end and a second end, wherein the first end of the first coupling part is coupled to one of the second hinge part and first joint part pivotally about a second pivot axis,
   wherein the bearing element of the first actuator is coupled to the second end of the first coupling part pivotally about a third pivot axis spaced apart from the second pivot axis.

2. The drive assembly according to claim 1, wherein the first actuator and the first coupling part during normal operation are arranged beyond a dead-center position in which the first pivot axis, the second pivot axis and the third pivot axis are arranged in an essentially straight line.

3. The drive assembly according to claim 1, wherein during normal operation the second pivot axis is axially arranged between the first pivot axis and the third pivot axis.

4. The drive assembly according to claim 1, wherein the second hinge part is displaceable to an elevated position relative to the first hinge part during an active operation, in which a pedestrian protection is provided.

5. The drive assembly according to claim 4, wherein during the active operation the first pivot axis, the second pivot axis and the third pivot axis are displaced beyond a dead-center position such that the first pivot axis, the second pivot axis and the third pivot axis define a triangle.

6. The drive assembly according to claim 4, wherein during the active operation the first coupling part is rotated about the second pivot axis.

7. The drive assembly according to claim 1, wherein the coupling assembly comprises a stop arrangement.

8. The drive assembly according to claim 7, wherein the stop arrangement comprises a stop element, wherein the stop element abuts against the one of second hinge part and first joint part to which the first end of the first coupling part is coupled.

9. The drive assembly according to claim 1, wherein the joint assembly is configured as a four-bar linkage and comprises a second joint part, wherein the first joint part and the second joint part each are configured as linkage arms pivotally connected between the first hinge part and the second hinge part.

10. The drive assembly according to claim 1, wherein the bearing element comprises a connecting section extending along a connecting axis to connect the bearing element to the first actuator, wherein the bearing element comprises a bearing section, wherein the bearing section comprises a receptacle having an elongated shape extending along a longitudinal axis, and wherein the connecting axis and the longitudinal axis are radially spaced apart.

11. A drive assembly for driving a flap, the drive assembly comprising
    a hinge assembly comprising a first hinge part connectable to a vehicle body and a second hinge part connectable to a vehicle flap;
    a joint assembly comprising at least a first joint part hingedly connecting said first hinge part with said second hinge part;
    a first actuator for driving the second hinge part to move between an opened and a closed position during a normal operation, wherein the first actuator has a first end and a second end, wherein the first end is coupleable to the vehicle body pivotally about a first pivot axis; and
    a coupling assembly for coupling the first actuator to the hinge assembly, wherein the second end of the first actuator is releasably coupled to one of the second hinge part and the first joint part via the coupling assembly.

12. The drive assembly according to claim 11, wherein the first actuator is decoupled from the one of the second hinge part and the first joint part by actuating the first actuator to drive the second hinge part to move towards the closed position.

13. The drive assembly according to claim 11, wherein the first actuator is decoupled from the one of the second hinge part and the first joint part after the second hinge part has been moved to a fully closed position.

14. The drive assembly according to claim 11, wherein a first connecting part is arranged near the second end of the first actuator.

15. The drive assembly according to claim 14, wherein the one of the second hinge part and the first joint part has a second connecting part releasably engageable with the first connecting part.

16. The drive assembly according to claim 15, wherein the second connecting part is integral with the one of the second hinge part and the first joint part.

17. The drive assembly according to claim 16, wherein the second connecting part is configured as a recess.

18. The drive assembly according to claim 14, wherein the first connecting part is configured as a pin.

19. The drive assembly according to claim 11, wherein the coupling assembly comprises a first coupling part having a first pivoting arm and a second pivoting arm, wherein the first pivoting arm of the first coupling part is coupled to the second end of the first actuator pivotally about a third pivot axis.

20. The drive assembly according to claim 19, wherein the second pivoting arm of the first coupling part is releasably coupled to the one of the second hinge part and the first joint part.

21. The drive assembly according to claim 11, wherein the joint assembly is configured as a four-bar linkage and comprises a second joint part, wherein the first joint part and the second joint part each are configured as linkage arms pivotally connected between the first hinge part and the second hinge part.

22. The drive assembly according to claim 11, wherein a bearing element is connected to the first actuator, wherein the bearing element comprises a connecting section extending along a connecting axis to connect the bearing element to the first actuator, and a bearing section, wherein the bearing section comprises a receptacle having an elongated shape extending along a longitudinal axis, wherein the connecting axis and the longitudinal axis are radially spaced apart.

23. A bearing element for use in a drive assembly, the bearing element comprising
- a connecting section extending along a connecting axis to connect the bearing element to an actuator of the drive assembly; and
- a bearing section, wherein the bearing section comprises a receptacle having an elongated shape extending along a longitudinal axis,
- wherein the connecting section and the bearing section are connected by an angle piece arranged between the connecting section and the bearing section,
- wherein the connecting axis and the longitudinal axis are thus radially spaced apart.

24. The bearing element according to claim 23, wherein the angle piece is integral with the connecting section and the bearing section of the bearing element.

\* \* \* \* \*